United States Patent Office.

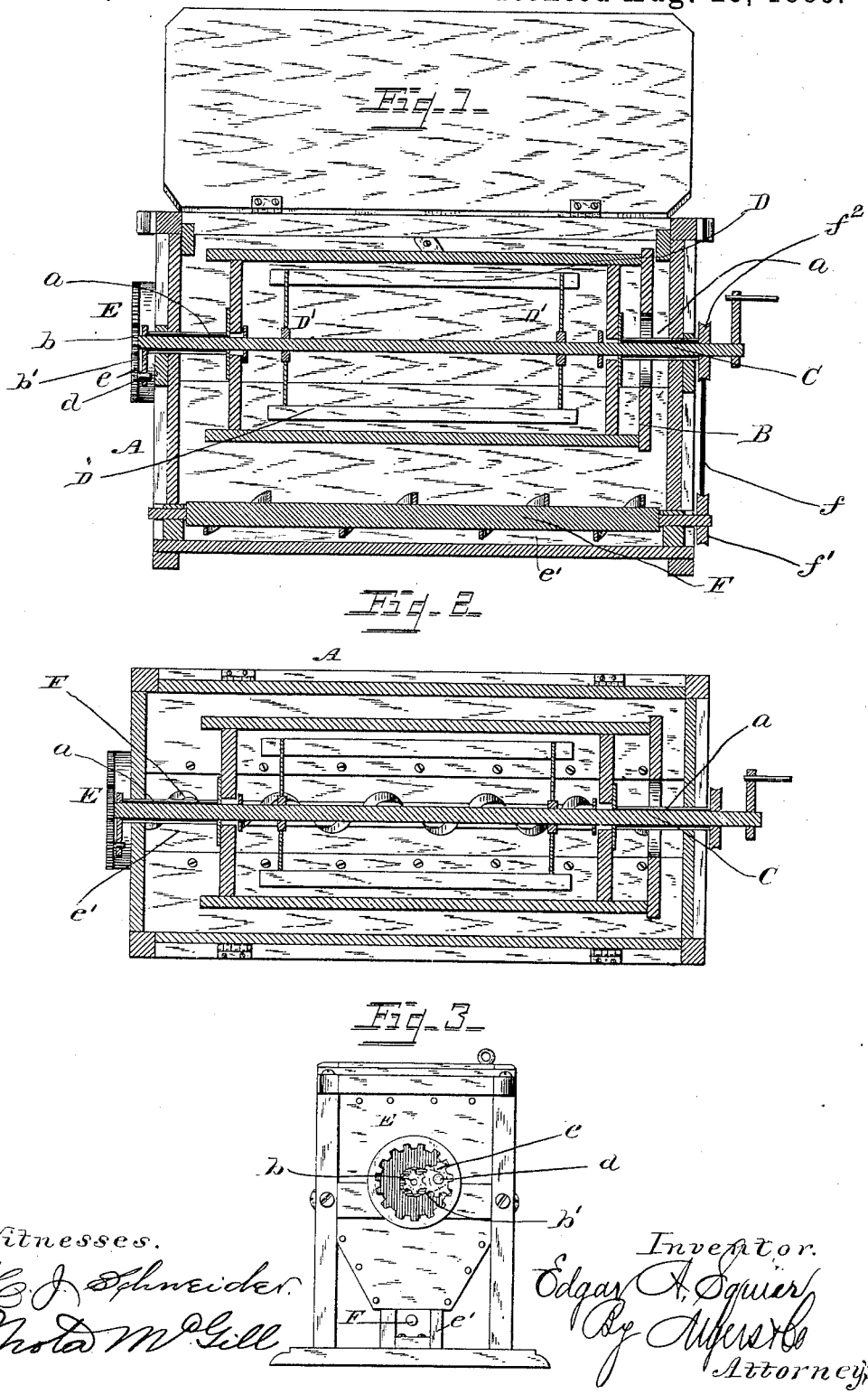

EDGAR ALLEN SQUIER, OF TIFFIN, OHIO.

CENTRIFUGAL BOLTING-REEL.

SPECIFICATION forming part of Letters Patent No. 325,128, dated August 25, 1885.

Application filed October 30, 1884. (No model.)

*To all whom it may concern:*

Be it known that I, E. A. SQUIER, a citizen of the United States of America, residing at Tiffin, in the county of Seneca and State of Ohio, have invented certain new and useful Improvements in Centrifugal Bolting-Reels, of which the following is a specification, reference being had therein to the accompanying drawings.

This invention has relation to improvements in flour-bolts, having for its object to effect the thorough bolting of the flour; and the invention consists of the combinations of parts and their construction substantially as hereinafter described and claimed.

In the accompanying drawings, Figure 1 is a vertical longitudinal section of my invention with the cover elevated. Fig. 2 is a horizontal section, and Fig. 3 is an end elevation, of the same.

In the embodiment of my invention I dispose the reels or bolts, together with the conveyer, in a suitable inclosure or chest, A, of any approved construction. The bolt or reel B, which is covered with bolting-cloth of the required degree of fineness, is connected to two hollow journals, $a$, with their inner ends connected to heads of the bolting-reel B, and bearing in the ends of the chest or receptacle A. Through the hollow journals $a$ and the reel B passes a driving-shaft, C, which may be driven by the application of power to its projecting end in any known way. Upon the shaft C are secured, at a suitable distance apart, radial arms D′, which carry beaters in the form of longitudinal peripheral strips or bars D, fastened to the outer ends of said arms, by means of which beaters the flour is thrown violently or forcibly against, and thus forced or bolted through, the bolt or reel B in a thorough and efficient manner. One end of the shaft C (passing out through one end of the chest or receptacle) has connection with one of the journals $a$ of the reel D by an epicycloidal wheel, said shaft C carrying a pinion, $b$, and a fixed revolving crank-shaft, $b'$, to which crank-shaft is connected one journal of the bolting-reel. Said shaft supports in its free end a short axis or shaft, $d$, bearing a second small pinion, $e$, gearing with the pinion $b$, and carried around with the rotation of said shaft. This pinion $e$ is caused to rotate also upon its own axis or shaft, being geared with a fixed internally-toothed wheel, E, fastened to that end of the chest or receptacle A, whereby the bolting-reel B, together with the beaters or bars D, are caused to revolve in the same direction, but at greatly different rates of speed, the beaters moving the faster, from which it is found better results are obtained in the bolting or sifting of the flour.

Within a trunk, $e'$, at the lower or bottom portion of the chest or receptacle A, is suitably supported the conveyer or screw-shaft F, the sides of the chest tapering toward the said trunk and said shaft to direct the bolted flour upon the latter, to permit of the flour being thus automatically removed from the chest. The conveyer or screw-shaft F is driven by a belt, $f$, encompassing a pulley, $f'$, upon its projecting end, and a pulley, $f^2$, upon the beater-shaft C.

Having thus fully described my invention, what I claim, and desire to secure by Letters Patent, is—

The combination of the reel, the beaters, beater-shaft, a pinion, and a revolving tubular crank-shaft, and a pinion journaled on the crank, in combination with the reel-journal connected to said revolving crank-shaft, and the internally-toothed fixed wheel or circular rack geared to the pinion borne by said crank, substantially as shown, and for the purpose described.

In testimony whereof I affix my signature in presence of two witnesses.

EDGAR ALLEN SQUIER.

Witnesses:
J. C. RICKENBAUGH,
J. F. BUNN.